(12) United States Patent
Shirai et al.

(10) Patent No.: US 6,665,056 B2
(45) Date of Patent: Dec. 16, 2003

(54) METHOD AND APPARATUS FOR MEASURING DISTANCE TO A DETECTION OBJECT

(75) Inventors: Noriaki Shirai, Kariya (JP); Katsuhiro Morikawa, Nagoya (JP); Yoshie Samukawa, Kariya (JP); Keiji Matsuoka, Kariya (JP); Toyohito Nozawa, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/293,285

(22) Filed: Nov. 14, 2002

(65) Prior Publication Data

US 2003/0103197 A1 Jun. 5, 2003

(30) Foreign Application Priority Data

Dec. 4, 2001 (JP) ......................... 2001-370134

(51) Int. Cl.[7] .............................. G01C 3/08; G01S 13/00
(52) U.S. Cl. ...................... 356/5.05; 356/5.01; 342/70; 342/92; 342/91
(58) Field of Search ................................ 356/3.01–5.15; 342/70, 91, 92; 367/98, 99; 180/167–169; 701/223, 301

(56) References Cited

U.S. PATENT DOCUMENTS

| | | | | |
|---|---|---|---|---|
| 4,049,961 A | * | 9/1977 | Marcy | 250/202 |
| 5,221,928 A | * | 6/1993 | Dahl | 342/205 |
| 5,298,905 A | * | 3/1994 | Dahl | 342/54 |
| 5,627,511 A | * | 5/1997 | Takagi et al. | 340/435 |
| 5,805,527 A | | 9/1998 | Hoashi et al. | |

FOREIGN PATENT DOCUMENTS

| | | |
|---|---|---|
| JP | 7-71957 | 3/1995 |
| JP | 7-128438 | 5/1995 |
| JP | 9-236661 | 9/1997 |
| JP | 9-318749 | 12/1997 |
| JP | 11-38137 | 2/1999 |
| JP | 2000-346941 | 12/2000 |

* cited by examiner

Primary Examiner—Thomas H. Tarcza
Assistant Examiner—Brian Andrea
(74) Attorney, Agent, or Firm—Posz & Bethards, PLC

(57) ABSTRACT

A method and apparatus of measuring a distance to a reflection object is disclosed. A sensitivity time control (STC) process is applied to a received signal from the reflection object to provide an STC-processed signal. The radar apparatus includes a controller. The controller obtains a quantity corresponding to the distance from a transmission time of the transmission signal and a detection time of the STC-processed signal. The quantity is corrected by using a first correction value associated with the intensity of the STC-processed reflection signal to provide a corrected quantity. The corrected quantity is further corrected by using a second correction value associated with the corrected quantity and the intensity of the STC-processed reflection signal to correct the error regardless of the intensity of the STC-processed reflection signal.

8 Claims, 8 Drawing Sheets

FOR A HIGHER REFERENCE VOLTAGE Vr1

FOR A LOWER REFERENCE VOLTAGE Vr2

METHOD AND APPARATUS FOR MEASURING DISTANCE TO A DETECTION OBJECT

BACKGROUND OF THE INVENTION

1. Field of the Invention

The invention relates to a radar apparatus for measuring a distance to a detection object by using the well-known sensitivity time control (STC) technique, and more particularly to a technique of correcting, with raised accuracy, errors caused by the STC and dependent on the intensity of reflected waves.

2. Description of the Prior Art

FIG. 1 is a diagram showing how the received reflection signals are STC amplified in an STC-based radar system for determining the distance or range from the radar system to a target object. In such a system, the amplification factor (A.F.) of an STC amplifier is varied with the period of time from the emission of a transmission signal to the reception of the reflected transmission signal as shown in FIG. 1. FIG. 1 also shows pulse waveforms of received reflection signals Vi1 and Vi2 received at times t1 and t2 measured from the emission of respective transmission signals and STC-amplified versions Vo1 and Vo2 of the received reflection signals Vi1 and Vi2, respectively. In this case, as is well known in the art, the STC-amplified reflection signals Vo1 and Vo2 are distorted in the STC process. The distortion causes an error (denoted by "β") between the peak position Tip of a pre-STC-amplification received reflection signal Vi and the peak position Top of the STC-amplified received reflection signal Vo. This error β (=Vop−Vip) is hereinafter referred to as "STC-distortion error". The shorter the distance or the signal transit time between the radar system and the target object is, the larger the STC-distortion error is as shown in FIG. 1. Thus, the STC-distortion error β depends on the signal transit time.

However, even if the distances to reflection objects are identical to each other, the intensities of refection signals from the reflection objects in a same range may vary depending on the reflectance of the reflection objects. FIG. 2 shows how the STC distortion of STC-amplified reflection signal is affected by the intensity of the received reflection signal. In FIG. 2, waveforms labeled "L" are for reference reflection signals of a predetermined level. FIG. 2A shows, for a smaller reflection signal, a pre-STC-amplification reflection signal Vsi and the STC-amplified version Vso of the signal Vsi. FIG. 2B shows, for a larger reflection signal, a pre-STC-amplification reflection signal VLi and the STC-amplified version VLo of the signal VLi. In FIG. 2, Vr is a reference voltage for determining the start timing and the end timing of each reflection signal. The error in the rising edges of the reference reflection signal L and each of the STC-amplified reflection signals Vso and VLo consists of a first error component D1 due to the intensity of the reflection signal and a second error component D2 due to the STC distortion. If the middle point Tc of the pulse width at the reference voltage Vr is calculated as the peak position Top of each STC-amplified reflection signal Vo, the peak position Top of each STC-amplified reflection signal Vo depends on the STC distortion and the intensity of the reflection signal. (The intensity of a reflection signal can be estimated by the pulse width measured by using the reference voltage Vr.) In other words, even if reflection objects are in an identical range, the peak positions of STC-amplified reflection signals from the reflection objects vary in response to the intensity of the STC-amplified reflection signals. Hereinafter, the error between the peak position of an STC-amplified reflection signal and the correct peak position (i.e., the time interval from which the true distance is calculated) is referred to as an "error due to received signal intensity" or "α error". Since the STC distortion error component D2 is an error in the rising edge, the error of the middle time Tc is equivalent to the arithmetic average of STC distortion error components in the rising edge and the falling edge.

From the foregoing description, it is seen that the above-mentioned STC-distortion error β depends on not only the signal transit time but also the intensity (or the measured pulse width) of a reflection signal.

Therefore, what is needed is a method and a system for correcting an error due to waveform distortion caused by an STC process in distance measurement by using a correction value determined not only by the signal transit time but also by the intensity (or the measured pulse width) of a reflection signal.

Also, what is needed is an STC-based radar apparatus that corrects an error due to waveform distortion caused by an STC process in distance measurement by using a correction value determined not only by the signal transit time but also by the intensity (or the measured pulse width) of a reflection signal.

There have been proposed various error correction techniques for distance measuring systems.

For example, U.S. Pat. No. 5,805,527, which is a counterpart of Japanese Patent Application Publication No. 9-236661 (1997), discloses "Method and apparatus for measuring distance". Though the patent deals with an error caused by variation in the intensity of the reception signal, it does not mention the above-described STC-distortion error.

Japanese Patent Application Publication No. 7-71957 (1995) discloses a distance measuring apparatus. The distance measuring apparatus corrects an error due to the STC distortion. However, the error correction is done with a correction value determined only by the signal transit time or the distance between the apparatus and the reflection object.

Thus, the prior art has failed to meet the above-mention needs.

SUMMARY OF THE INVENTION

According to an aspect of the invention, the above-mentioned problems are solved by a method of measuring a distance to a reflection object in a radar apparatus that transmits a transmission signal and applies a sensitivity time control (referred to as "STC") process to a reflection signal from said reflection object to yield an STC-processed reflection signal. In the method, a quantity corresponding to the distance is obtained from a transmission time of the transmission signal and a detection time of the STC-processed reflection signal. The quantity is corrected considering an error which is caused by an STC distortion and depends on the intensity of the STC-processed reflection signal.

The correction of the quantity is achieved by correcting the quantity by using a first correction value associated with the intensity of the STC-processed reflection signal to provide a corrected quantity; and correcting the corrected quantity by using a second correction value associated with the corrected quantity and the intensity of the STC-processed reflection signal to correct the error regardless of the intensity of the STC-processed reflection signal.

The above-described method is preferably realized by a computer program. The computer program may be stored in a computer-readable storage media such as a flexible disc, a hard disc, a magneto-optical disc, CD-ROM, ROM, etc. and is loaded into a system RAM for execution if necessary. Alternatively, the computer program may be loaded into a system RAM via any network.

According to another aspect of the invention, there is provided a radar apparatus for measuring a distance to a reflection object. The apparatus transmits a transmission signal by using a laser diode for example and applies a sensitivity time control process to a received signal from the reflection object by using, for example an STC amplifier to provide an STC-processed signal. The radar apparatus includes a controller. The controller obtains a quantity corresponding to the distance from a transmission time of the transmission signal and a detection time of the STC-processed signal; and corrects the quantity considering an error which is caused by an STC distortion and depends on the intensity of the STC-processed reflection signal. The controller corrects the quantity in the above-described manner.

The radar apparatus may detect a pulse width of the STC-processed signal through a comparison with a reference voltage by using a comparator and a time measuring circuit for example. The detected pulse width is used as the intensity of the STC-processed signal in correcting the quantity and the corrected quantity.

Alternatively, in addition to the time measuring circuit, the radar apparatus may include a first comparator for detecting a wider pulse width of the STC-processed signal by using a lower reference voltage and a second comparator for detecting a narrower pulse width of the STC-processed signal by using a higher reference voltage higher than the lower reference voltage. In the event the narrower pulse width is obtained in addition to the wider pulse width, the controller corrects the quantity by using a first-class first correction value associated with the narrower pulse width to provide the corrected quantity; and corrects the corrected quantity by using a first-class second correction value associated with the corrected quantity and the narrower pulse width of the STC-processed signal. And, in the event only the wider pulse width is obtained, the controller corrects the quantity by using a second-class first correction value associated with the wider pulse width to provide the corrected quantity, and corrects the corrected quantity by using a second-class second correction value associated with the corrected quantity and the wider pulse width of the STC-processed signal.

The middle time of the pulse width of the STC-processed signal may be calculated as the detection time of the STC-processed signal in obtaining a quantity corresponding to the distance.

BRIEF DESCRIPTION OF THE DRAWING

Further objects and advantages of the present invention will be apparent from the following description of the preferred embodiments of the invention as illustrated in the accompanying drawing, in which.

Throughout the drawing, the same elements when shown in more than one figure are designated by the same reference numerals.

DETAILED DESCRIPTION OF THE PREFERRED EMBODIMENTS

Constitution of a Preferred Embodiment

Figure 3:
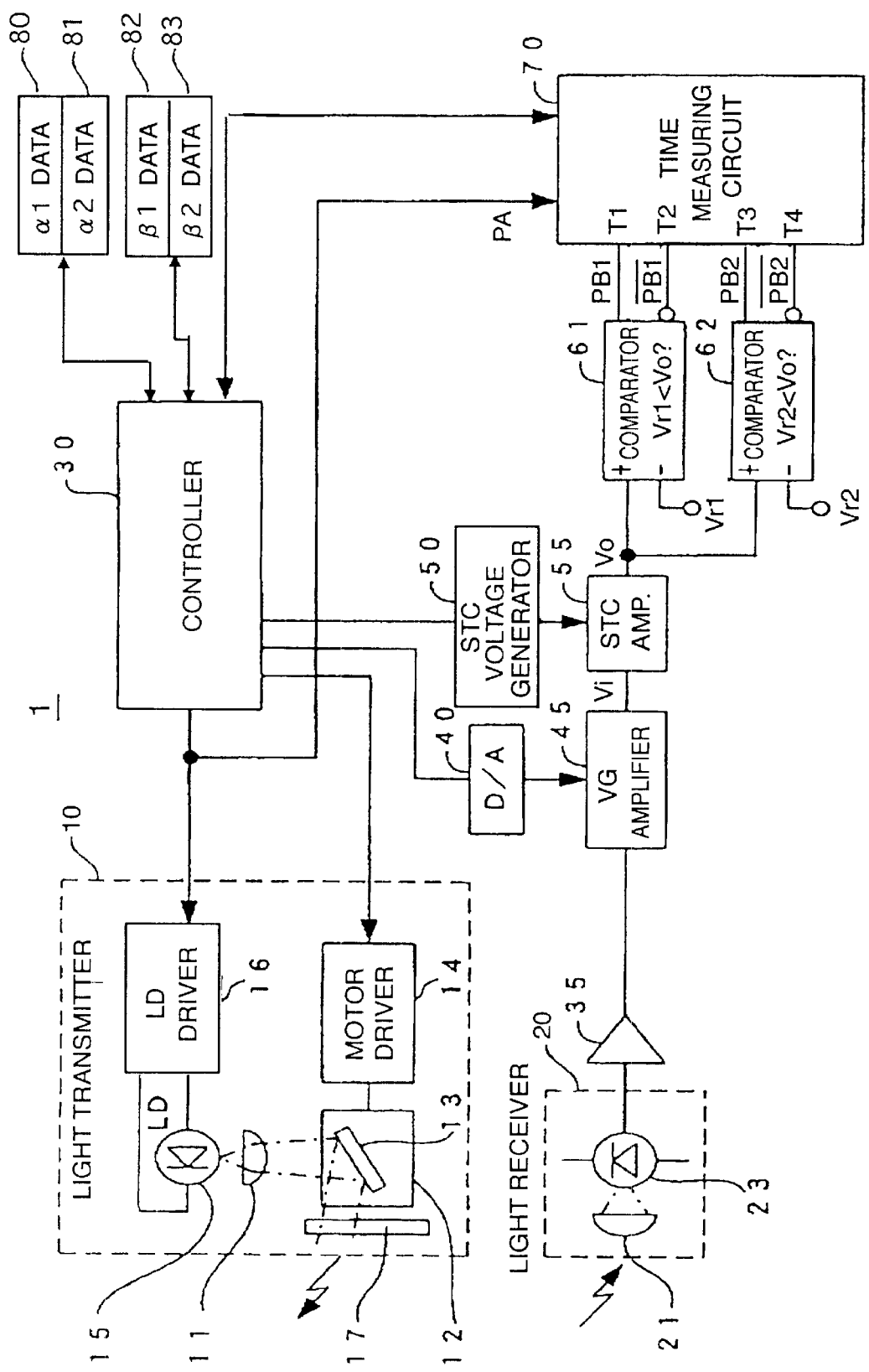
FIG. 3 is a schematic block diagram showing an exemplary arrangement of a radar apparatus according to an illustrative embodiment of the invention.
Figure 4:
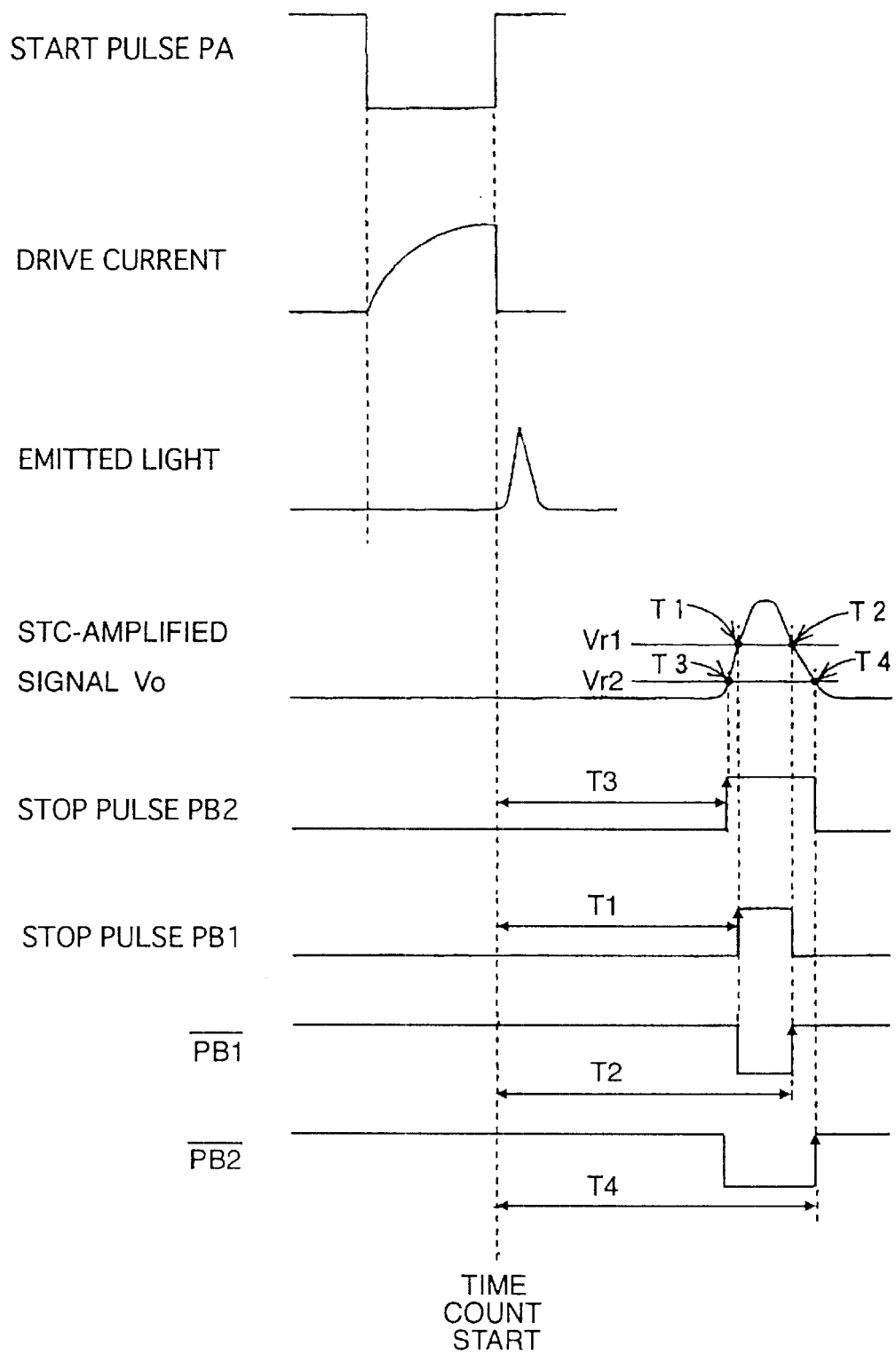
FIG. 4 is a timing chart for illustrating how the signal transit time is measured in the radar apparatus 1 of FIG. 3.

FIG. 3 is a schematic block diagram showing an exemplary arrangement of a radar apparatus used in a motor vehicle and for measuring the distance to a reflection object in accordance with an illustrative embodiment of the invention. FIG. 4 is a timing chart for illustrating how the signal transit time is measured in the embodiment. In FIG. 3, the radar apparatus 1 includes a controller 30 for providing the overall control of the apparatus 1 and a light transmitter 10 for transmitting a laser light pulse in a direction specified by an angular position signal from the controller 30 in response to a transmission control signal or start pulse (shown as "PA" in FIG. 4) supplied from the controller 30. The controller 1 may be any suitable microcomputer including a not-shown CPU (central processing unit), a not-shown ROM (read only memory), a not-shown RAM (random access memory), various input/output circuits, etc. as is well known in the art.

The light transmitter 10 comprises a laser diode driver 16 for supplying an LD drive current in response to the start pulse PA from the controller 30, a laser diode (LD) 15 for transmitting a laser light depending on the LD drive current as shown in FIG. 4, a lens 11 for converting the emitted light into a substantially parallel laser light beam (hereinafter referred to as "emitted light" or "transmission signal"), and a scanner 12 for directing the emitted light in a direction determined by a motor drive signal. In the scanner 12, a mirror 13 is set swingable on a vertical shaft. The light transmitter 10 further includes a motor driver 14 for supplying the motor drive signal to a not-shown motor in response to the angular position signal so as to set the angular position of the mirror 13 such that the transmission signal is directed to a direction specified by the angular position signal, and a light transmitting lens 17 through which the emitted light is transmitted. As the mirror 13 swings and hence the angular position of the mirror 13 varies, the direction of the transmission signal is changed so that a given angular range in front of the subject vehicle is scanned by the transmission signal.

The radar apparatus 1 further includes a light receiver 20 that includes a condenser lens (or a light receiving lens) 21 and a photodetector or photosensor 23 for providing, as a received reflection signal, a photo-current having the intensity depending on the intensity of a received reflection signal. The reflection signal is guided to the photodetector 23 via condenser lens 21.

The radar apparatus 1 further comprises an amplifier 35 for amplifying the photo-current, a variable-gain (VG) amplifier 45 having its input terminal connected to the amplifier 35 output, a digital-to-analog (D/A) converter 40 for receiving data indicative of a specified amplification factor from the controller 30 and supplying a gain control signal responsive to the specified amplification factor to the gain control input terminal of the variable-gain amplifier 45, an STC voltage generator 50 for generating an STC voltage that varies in a predetermined sweep pattern in response to a trigger signal given by the controller 30, and an STC amplifier 55 for STC-amplifying the reflection signal Vi from the VG amplifier 45 output according to the STC voltage to provide an STC-amplified reflection signal Vo. The STC voltage generator 50, which varies the STC voltage from a minimum level to a maximum level, is preferably so arranged as to keep the maximum level after the STC voltage has reached the maximum level till the generator 50 receives the next trigger signal from the controller 30.

The radar apparatus 1 further comprises comparators 61 and 62 and a time measuring circuit 70. The output Vo of the STC amplifier 55 is coupled to the first input of each of the comparators 61 and 62. To the second input terminals of the comparators 61 and 62, there are applied the first reference voltages Vr1 and the second reference voltage Vr2 for each detecting the start timing and the stop timing of the STC-amplified reflection signal Vo. The comparator 61 provides a first stop signal PB1 indicative of whether the STC-amplified reflection signal Vo is larger than the first reference voltage Vr1 and the negative logic version $\overline{PB1}$ of the first stop signal PB1. Similarly, the comparator 62 provides a second stop signal PB2 indicative of whether the STC-amplified reflection signal Vo is larger than the second reference voltage Vr2 and the negative logic version $\overline{PB2}$ of the second stop signal PB2. The stop signals PB1, $\overline{PB1}$, PB2 and $\overline{PB2}$ from the comparators 61 and 62 are supplied to the time measuring circuit 70. When the above-mentioned start pulse PA is output from the controller 30, the start pulse PA is also supplied to the time measuring circuit 70. This causes the time measuring circuit 70 to start its operation at the end of the start pulse PA, i.e., at the rising edge of the start pulse PA in the specific example of FIG. 4. Thus, the time measuring circuit 70 is preferably so designed as to measure a time by detecting the rising edge of each of the stop signals or pulses PB1, $\overline{PB1}$, PB2 and $\overline{PB2}$ from the comparators 61 and 62. This enables the measurement of times T3, T1, T2 and T4 from the rising edges of the stop pulses PB2, PB1, $\overline{PB1}$ and $\overline{PB2}$, respectively, by using the two reference voltages Vr1 and Vr2 as shown in FIG. 4. The measured times are binary corded and passed to the controller 30.

Also, the time measuring circuit 70 is preferably so designed as to be able to measure minute time intervals. For example, even if a plurality of reflection signals are received for a single transmission signal or start pulse PA, the time measuring circuit 70 preferably be able to measure times T3, T1, T2 and T4 or time intervals between adjacent two of the stop pulses PB2, PB1, $\overline{PB1}$ and $\overline{PB2}$ for each of the received reflection signals.

Such the time measuring circuit 70 may be realized, for example, by using a ring oscillator having an odd number of stages connected in a ring. Each stage comprises an inverter gate delay circuit for providing the inverted version of the input signal thereof. An electrical pulse edge is circulated through the ring. The time measuring circuit 70 operates as follows. In response to a reception of a start pulse PA from the controller 30, the circuit 70 causes an electrical pulse edge to circulate through the ring. When the circuit 70 receives a stop pulse or one of the comparator outputs PB2, PB1, $\overline{PB1}$ and $\overline{PB2}$, the circuit 70 detects which of the inverter gate delay circuits the electrical pulse edge has reached. The phase difference or time interval between the start pulse PA and the stop pulse is calculated from the position of the pulse edge in the inverter gates.

It is preferable that the time measuring circuit 70 has the function of correcting time resolution to implement accurate time measurement. For example, the time measuring circuit 70 includes a full digital circuit that makes digital arithmetic correction by using a reference signal (such as a clock signal generated by a quartz-crystal oscillator). The time measuring circuit 70 can evaluate a time (a phase difference between a start pulse PA and a stop pulse) at a resolution remarkably higher than that of a usual timer circuit, which has a resolution at most equivalent to the period of the clock signal. Accordingly, even if two or more reflection signals are received for a single laser pulse, the time measuring circuit 70 can measure the time difference for each of the received reflection signals. From the measured time difference, the controller 30 calculates the distance to a reflection object in the direction determined by the current angular position of the scanner mirror 13.

The radar apparatus 1 is preferably provided with α1 data set 80 and α2 data set 81 for use in correction of the above-mentioned α error due to received signal intensity (detailed later) and β1 data set 82 and β2 data set 83 for use in correction of the above-mentioned STC-distortion error (detailed later).

Preparation of Error Correction Data
1. α Error Correction

Figure 5:
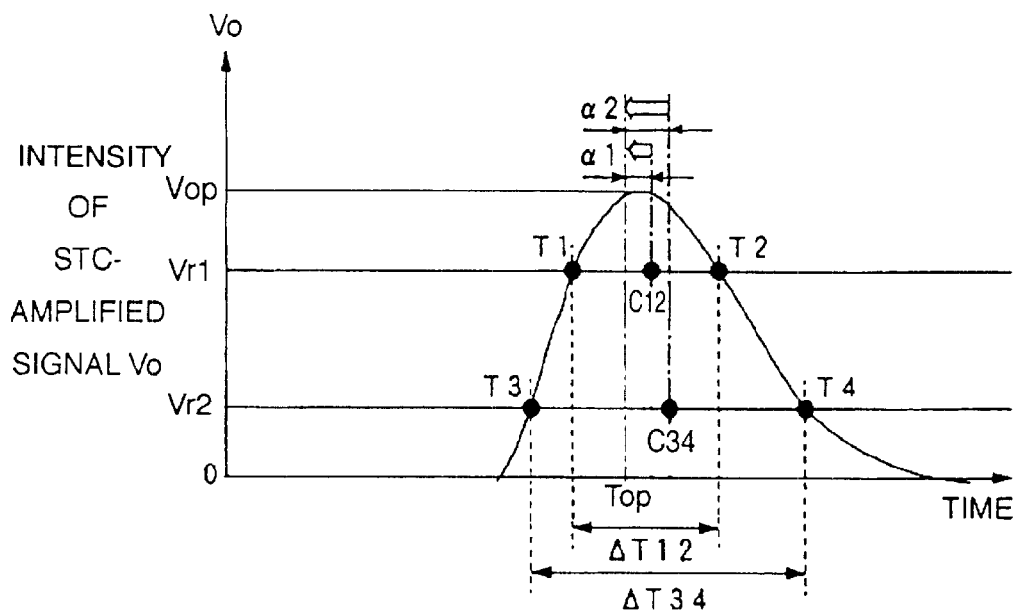
FIG. 5 is a diagram illustrating the way of correcting the error due to received signal intensity in accordance with principles of the invention.

FIG. 5 is a diagram illustrating the way of correcting the error due to received signal intensity in accordance with principles of the invention. It is assumed that the waveform of FIG. 5 is for a receive signal that has not been subjected to the STC amplification or for an STC-amplified signal obtained when the STC amplifier has reached the state of the gain being constant (in other words when a reflection plate is placed sufficiently (e.g., 30 m or more) apart from the radar apparatus 1. In FIG. 5, the abscissa indicates the time lapsed from the start pulse PA output, and the ordinate indicates the intensity of an STC-amplified signal Vo from the STC amplifier 55. A time Top is the time when the STC-amplified signal Vo reaches its peak value. Assuming that the pulse width calculated by using times T1 and T2 measured by using the first reference signal Vr1 is ΔT12, then it follows that ΔT12=T2−T1. Similarly, assuming that the pulse width calculated by using times T3 and T4 measured by using the second reference signal Vr2 is ΔT34, then it follows that ΔT34=T4−T3.

These pulse widths or time differences ΔT12 and ΔT34 correspond to the intensity of the received reflection signal and accordingly to the maximum or peak value Vop of the STC-amplified reflection signal. The lower the received signal intensity becomes, the smaller the time differences becomes, and the higher the received signal intensity becomes, the larger the time differences becomes. If the intensity Vop of the STC-amplified signal is not so high as to reaches the first reference voltage Vr1, only the time difference ΔT34 exists.

Assume that the middle time between times T1 and T2 is C12 and the difference between the middle time C12 and the peak time Top at which the STC amplified signal takes the maximum value is equal to α1. Also, assume that the middle time between times T3 and T4 is C34 and the difference between the middle time C34 and the peak time Top is equal to α2. Then, we obtain:

$$\begin{aligned} Top &= C12 - \alpha 1 \quad \text{for reference voltage } Vr1 \\ &= C34 - \alpha 2 \quad \text{for reference voltage } Vr2. \end{aligned} \quad (1)$$

Accordingly, if the time offset value α1 (for STC-amplified signals with a peak value higher than the first reference voltage Vr1) or α2 (for STC-amplified signals with a peak value ranging from the second reference voltage Vr2 to the first reference voltage Vr1) has been obtained, in advance, for each of an appropriate number of sample peak values or transmission signals (or light pulses) in a possible range through experiment, then it is possible to correct the middle times C12 and C34 by using a time offset α1 or α2 associated with the intensity or pulse width of the STC-amplified signal in actual distance measurement. The way of collecting correction values or time offsets α1 and α2 is described in the following referring to FIG. 6.

Figure 6:
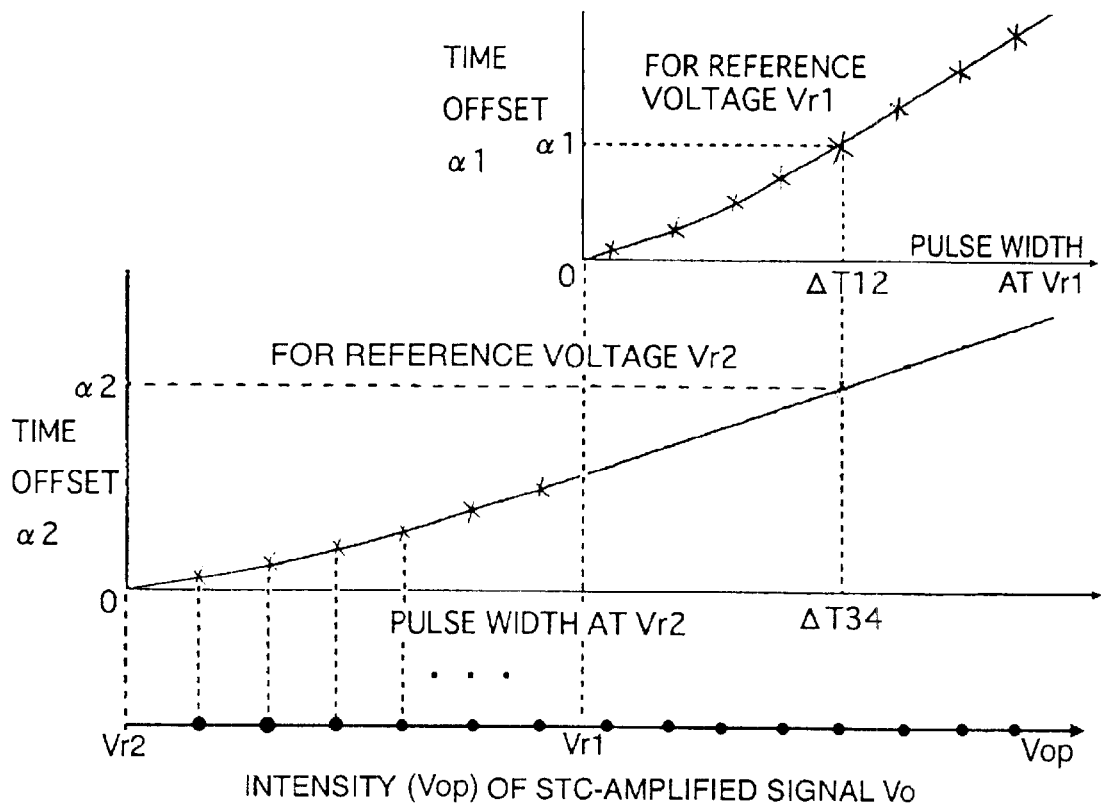
FIG. 6 is a diagram showing, for each of the reference voltages Vr1 and Vr2, the relationship between the pulse width corresponding to the received reflection signal intensity and a time offset for correcting the a error.

FIG. 6 is a diagram showing, for each of the reference voltages Vr1 and Vr2, the relationship between the pulse width corresponding to the received reflection signal intensity and a time offset for correcting the α error. A series of measurements are made for an appropriate number of sample transmission signals gradually changed in intensity with a sample reflection object set at a predetermined or known distance from a radar system prepared for the measurement. The intensities or peak values of the STC-amplified versions of the sample transmission signals are shown by dots plotted on the intensity (Vop) axis. For each sample transmission signal or each dot on the Vop axis, the signal transit time from transmission to reception is measured. For each of sample transmission signals the STC-amplified intensities of which range from Vr2 to Vr1 on the Vop axis, the pulse width ΔT34 is obtained for the second reference voltage Vr2, and the second time offset α2 is calculated as follows:

$$\alpha 2 = C34 - Tr,$$

where Tr is a sample signal transit time calculated from the actual distance between the sample reflection object and the radar system used in the measurement. While, for each of sample transmission signals the STC-amplified intensities of which exceed Vr1 on the Vop axis, the pulse width ΔT12 is obtained for the first reference voltage Vr1, and the first time offset α1 is calculated as follows:

$$\alpha 1 = C12 - Tr.$$

Figure 7:
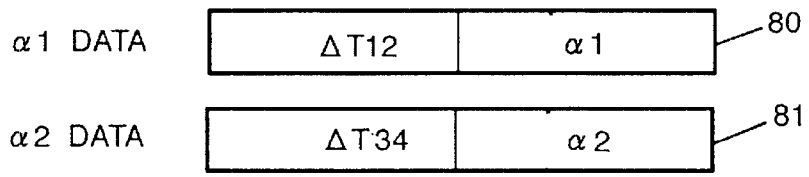
FIG. 7 is a diagram showing structures of α1 data table 80 and α2 data table 81 for use in α error correction.

The calculated time offset α1 is stored as α1 data 80 in association with the pulse width ΔT12 as shown in FIG. 7. The calculated time offset α2 is stored as α2 data 81 in association with the pulse width ΔT34.

2. STC Distortion Error Correction

Figure 8A:
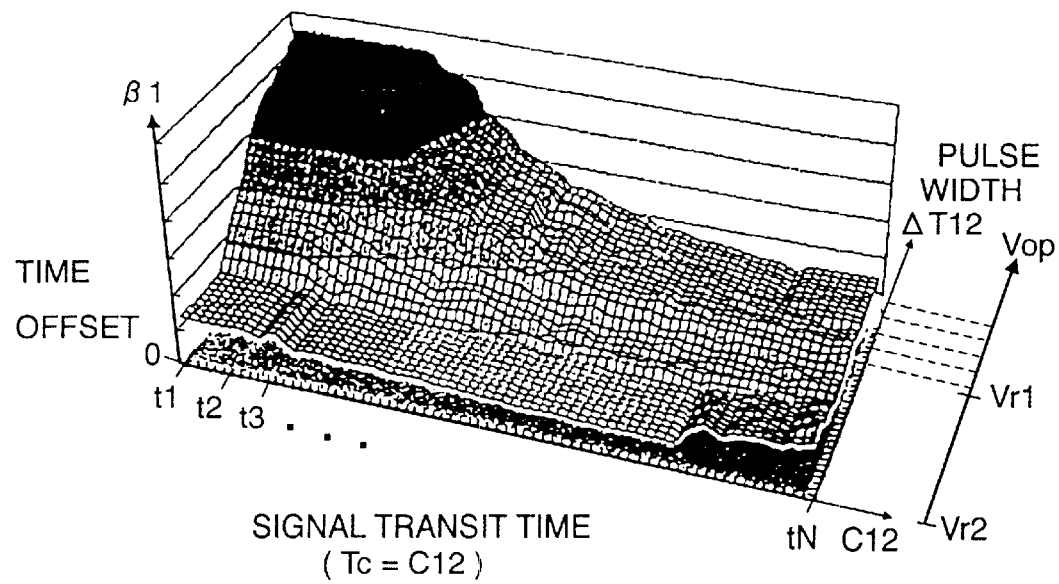
FIGS. 8A and 8B are three-dimensional graphs each showing, for the reference voltage Vr1 or Vr2, the relationship among the signal transit time C12 or C34, the pulse width ΔT12 or Δ34 and a time offset β1 or β2 for correcting the STC-distortion error.
Figure 8B:
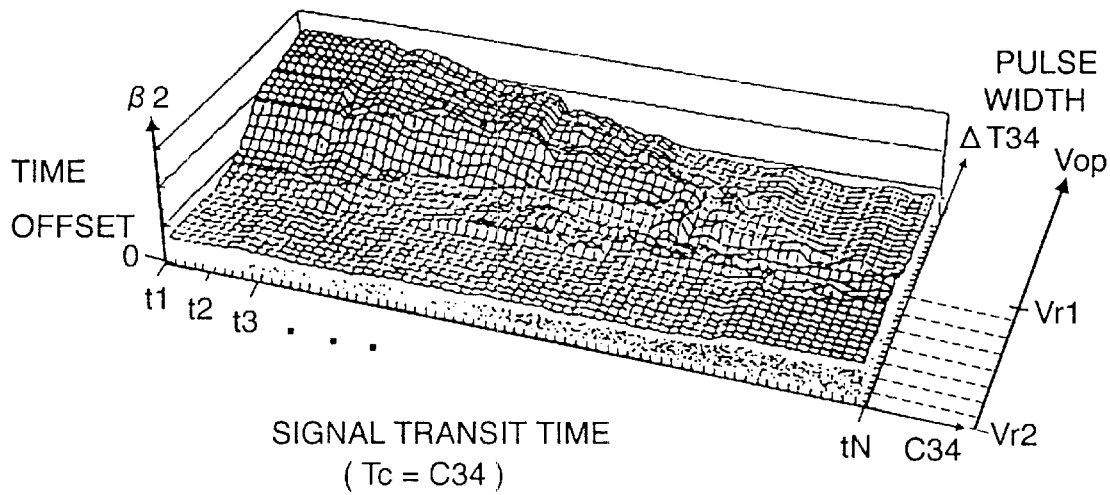

As described above, since the above-mentioned STC-distortion error β depends on the signal transit time and the intensity (or the measured pulse width) of a reflection signal, it is necessary to correct the STC distortion error by using a correction value determined not only by the signal transit time but also by the intensity (or the measured pulse width) of a reflection signal. FIGS. 8A and 8B are three-dimensional graphs each showing, for the reference voltage Vr1 or Vr2, the relationship among the signal transit time C12 or C34 (corresponding to the distance), the pulse width ΔT12 or ΔT34 corresponding to the received reflection signal intensity and a time offset β1 and β2 for correcting the STC-distortion error. As shown in FIG. 8, the STC distortion error increases as the variation rate of the STC amplifier gain increases (i.e., the signal transit time becomes shorter) and the signal intensity (or the pulse width ΔT12 or ΔT34) increases.

In this case, a set of correction values or time offsets β1 and a set of time offsets β2 are separately obtained for the first Vr1 and second Vr2 reference voltages, respectively. It is assumed that the time offsets β are measured for each of N signal transmit times t1, t2, ..., tN, which correspond to N values of the distance to a sample reflection object or plate by changing the position of the sample reflection object or the radar system used in the measurement. Then, as seen from FIG. 8, a series of measurements are made for an appropriate number of sample transmission signals (Vop values from which broken lines begin in FIG. 8) gradually changed in intensity for each of the N signal transmit times t1, t2, ..., tN by changing the size of the reflection plate or by changing the transparency of a filter (not shown) placed between the reflection plate and the radar apparatus 1.

Figure 9A:
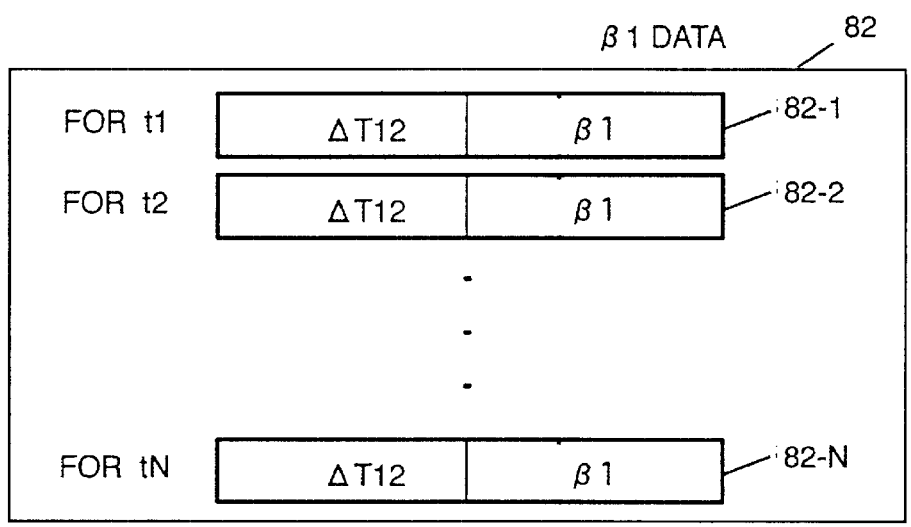
FIGS. 9A and 9B are diagrams showing the structures of β1 data 82 and β2 data table 83 for use in STC-distortion error correction.
Figure 9B:
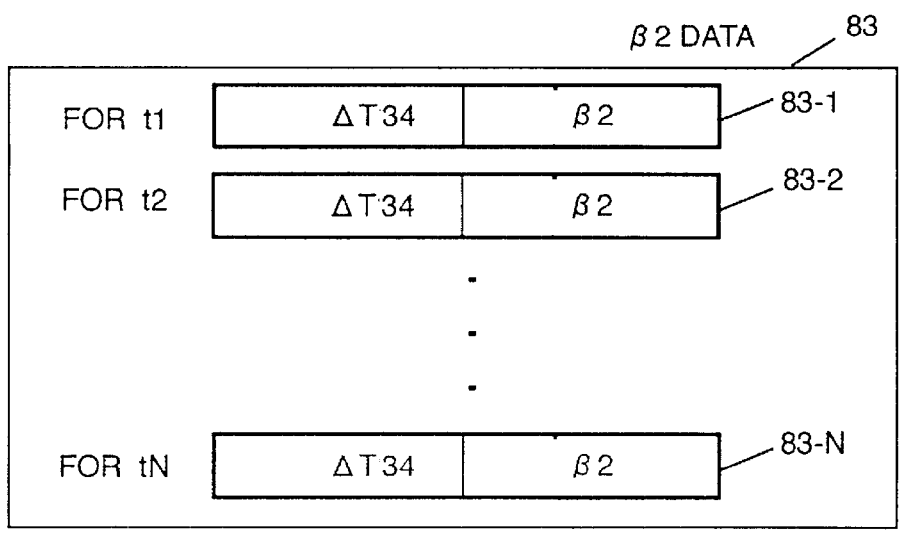

In case of time offsets β1 for example, the calculated time offsets β1 through experiment for a signal transmit time ti (i=1–N) is are stored in association with respective pulse widths ΔT12 in the form of a table 82-*i* as shown in FIG. 9A. Similarly, in case of time offsets β2, the calculated time offsets β2 through experiment for a signal transmit time ti (i=1–N) is are stored in association with respective pulse widths ΔT34 in the form of a table 83-*i* as shown in FIG. 9B.

The above-described time offset data sets α1, α2, β1 and β2 are preferably stored in not-shown ROM of the controller 30.

It should be noted that in either case of α error correction values and STC distortion error correction values, time offsets α1 and α2 (or β1 and β2) are separately prepared for higher intensity signals (or the higher reference voltage Vr1) and lower intensity signals (or the lower reference voltage Vr2). The reason for doing this is as follows.

The received reflection signal usually contains heat noise and other noise components caused by an effect of the noise limit. These noises cause a measurement error in measuring the time when the STC-amplified signal crosses a reference voltage. The measurement error becomes larger when the time width measurement is made by using a lower reference signal. In this sense, the time width measurement is preferably made by using a higher reference voltage. Accordingly, time offsets α1 and α2 (or β1 and β2) are prepared for higher-intensity and lower-intensity reflection signals so as to use, for higher reflection signals, the pulse width ΔT12 which is less affected with the measurement error.

Operation

Figure 10A:
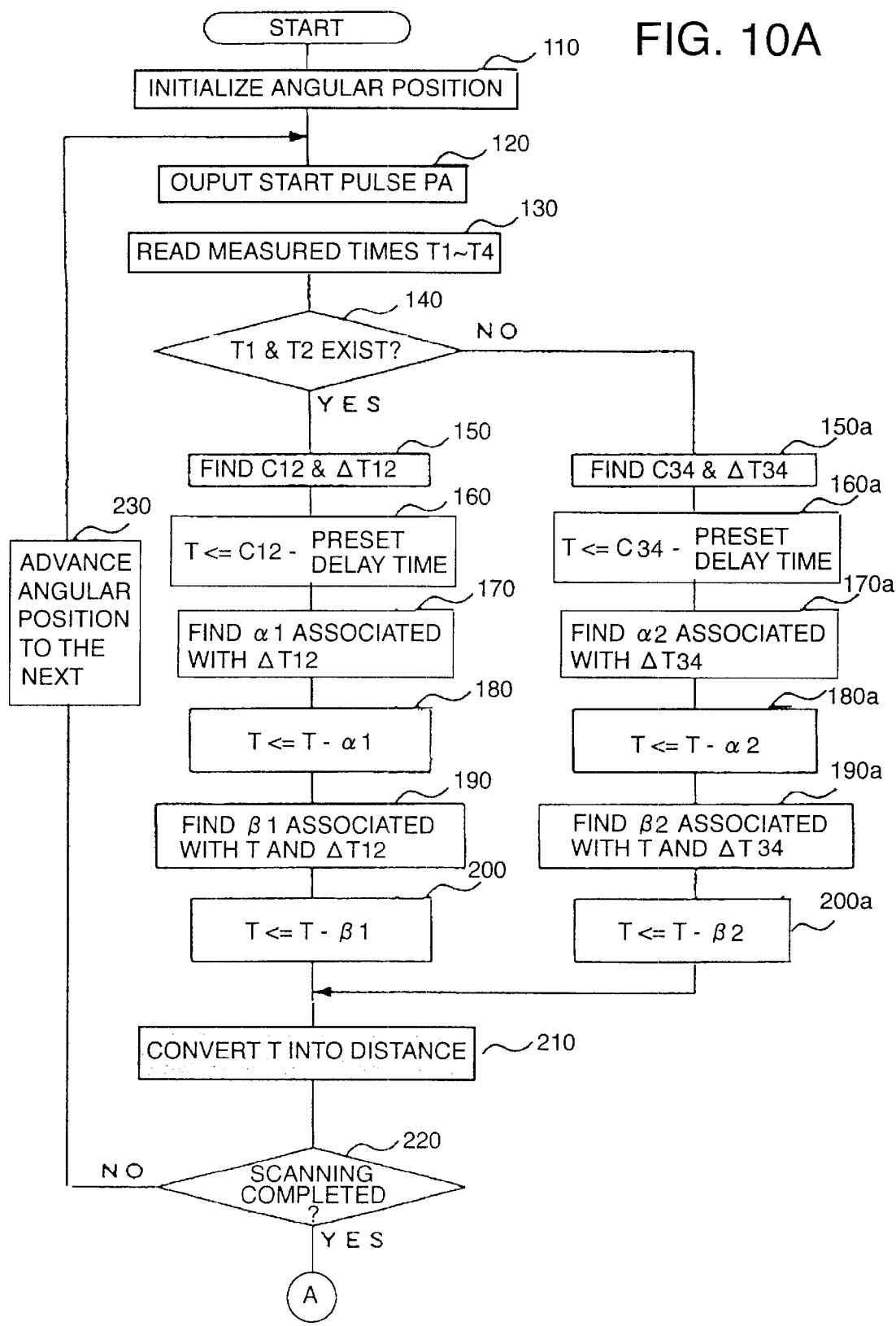
FIGS. 10A and 10B are diagrams which, when combined by junctions labeled "A" encircled with a circle, constitute a flowchart showing the operation executed by the controller 30 for one scan of distance measurements.
Figure 10B:
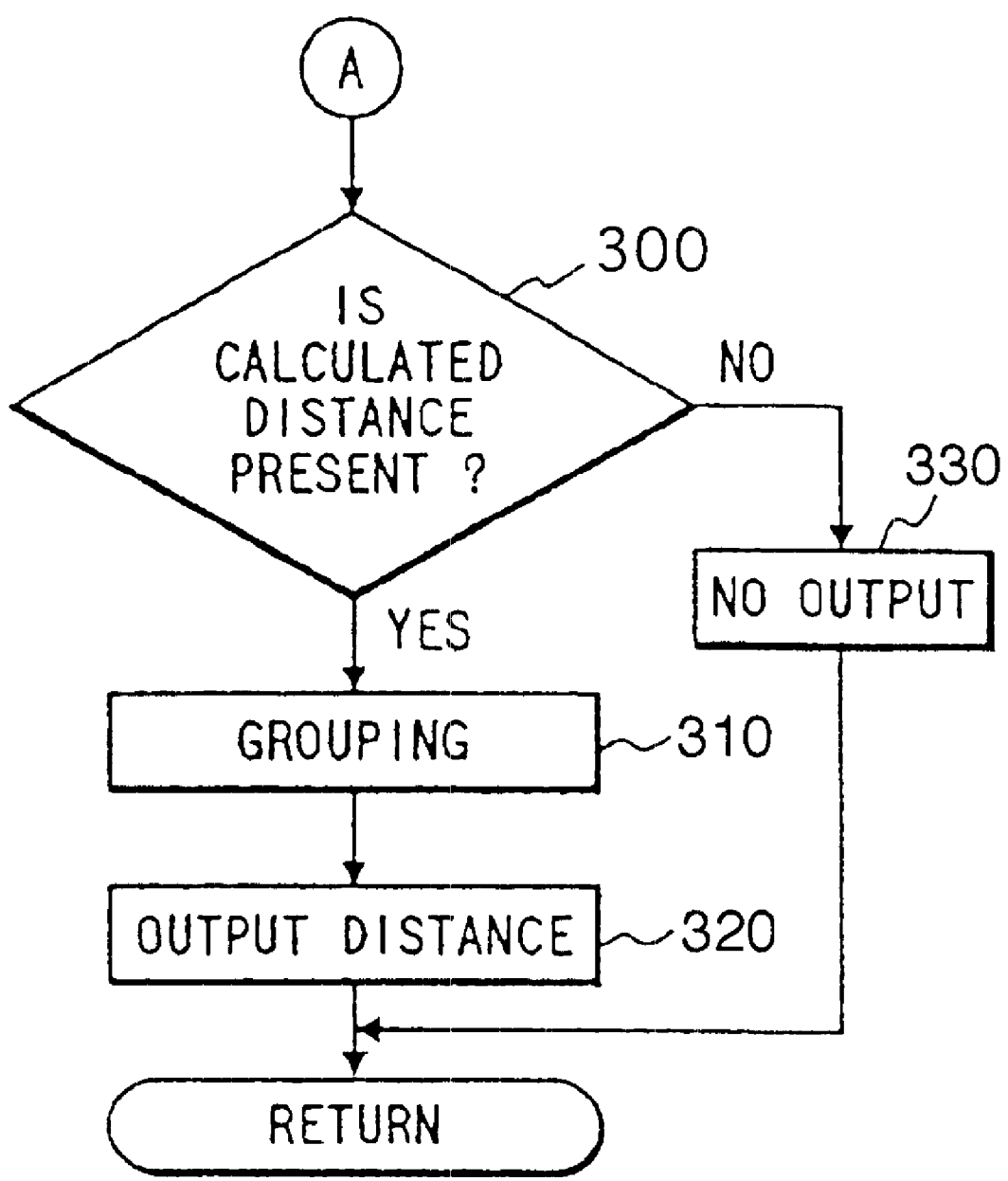

FIG. 10 is a flowchart showing the operation executed by the controller 30 for one scan of distance measurements under the control of a program stored in the not-shown ROM in the controller 30. When a scan of distance measurements is to be started, the controller 30 starts the operation of FIG. 10. step 110 initializes the angular position of the mirror 13 to a predetermined initial position. Step 120 outputs the start pulse PA, which is applied to the LD driver 16 t cause the laser diode 15 to emit a transmission signal (i.e., a laser pulse in this specific example) as shown in FIG. 4. The start pulse PA is also supplied to the time measurement circuit 70, which in turn starts a pulse edge going along the above-mentioned inverter gate delay circuit therein.

Figure 1:
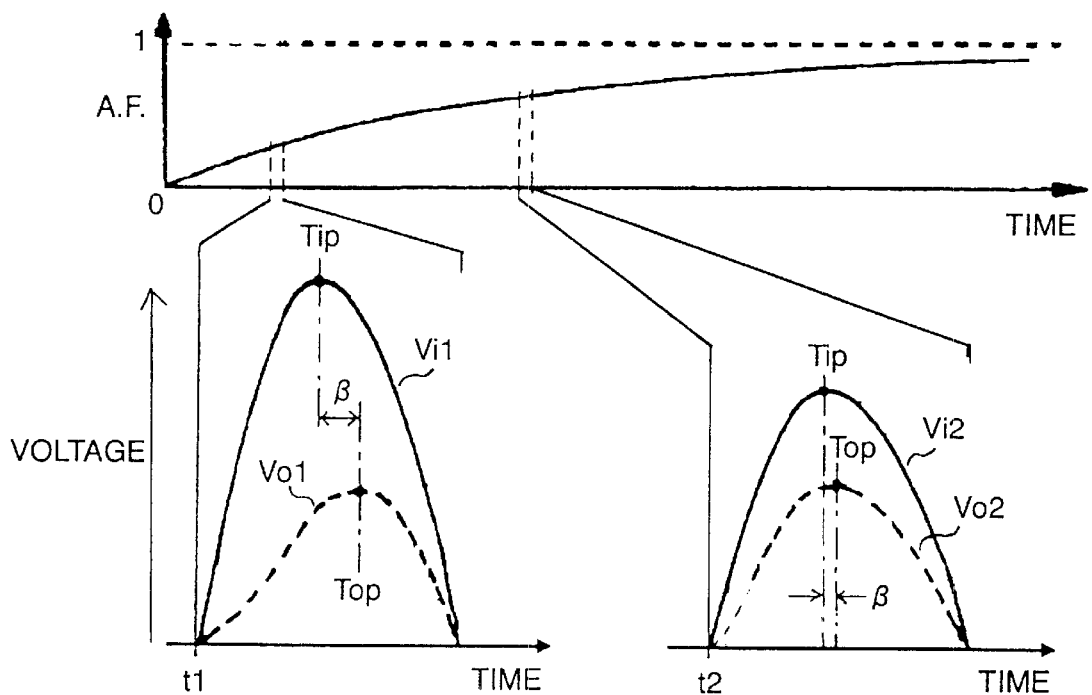
FIG. 1 is a diagram showing how the received reflection signals are STCed in an STC-based radar system for determining the distance or range from the radar system to a target object.
Figure 2A:
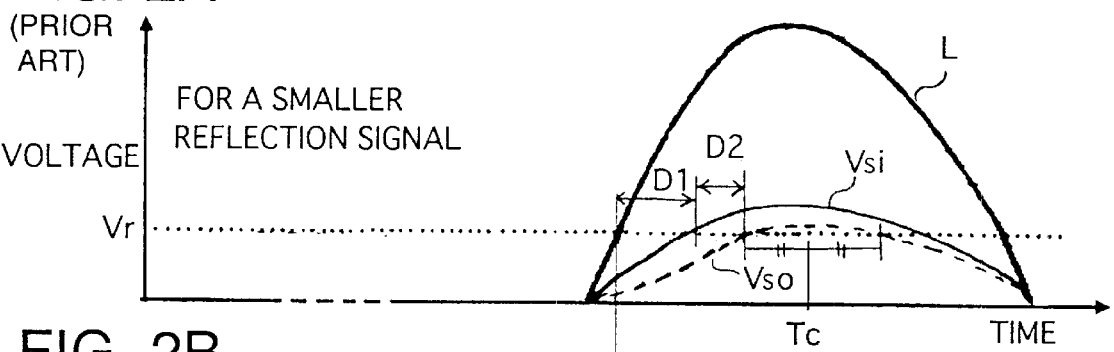
FIGS. 2A and 2B are graphs for a smaller reference signal and a larger reference signal, respectively, and together show how the distortion of STC-amplified reflection signal is affected by the intensity of the received reflection signal.
Figure 2B:
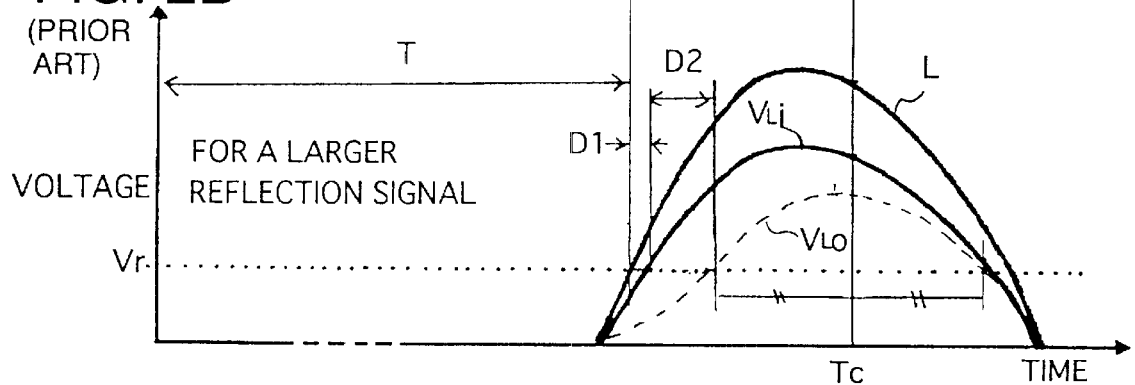

The emitted light is reflected by a reflection object (not shown) and returns to the radar apparatus 1 as a reflection signal, which is received by the light receiver 20, amplified by the amplifier 35, amplified by the variable-gain amplifier 45 to become the received reflection signal Vi, which is STC-amplified by the STC amplifier 55 into the STC-amplified reflection signal Vo as shown in FIGS. 1 and 4. The STC-amplified reflection signal Vo is supplied to the comparators 61 and 62. As described above, the comparator 61 compares the signal Vo with the first reference voltage Vr1 to output stop pulses PB1 and $\overline{PB1}$ to the time measurement circuit 70. Similarly, the comparator 62 compares the signal Vo with the second reference voltage Vr2 to output stop pulses PB2 and $\overline{PB2}$ to the time measurement circuit 70. Then, the time measurement circuit 70 measures, for the reference voltages Vr1 and Vr2, the start (T1 and T3) and end (T2 and T4) times of the STC-amplified reflection signal Vo by using the received stop pulses (PB1 and PB2) and ($\overline{PB1}$ and $\overline{PB2}$), respectively, and tries to pass the measured times T1 through T4 to the controller 30.

Responsively, step 130 reads the measured times T1 through T4. Then, step 140 makes a test to see if the measured times include times T1 and T2.

If the measured times T1 and T2 are included, then the control is passed to step 150. Step 150 finds the pulse width T12 and the middle time C12 between T1 and T2 as follows:

$$\Delta T12 = T2 - T1, \text{ and}$$

$$C12 = (T1 + T2)/2.$$

The middle time C12 is used with the start pulse PA to determine the signal transit time, which corresponds to the distance between the reflection object and the radar apparatus 1. However, the middle time C12 includes a propagation delay time within the circuit path from the photodetector 23 to the time measurement circuit 70. Since the propagation delay time is considered to be constant, step 160 regards the middle time C12 minus a preset delay time as the signal transit time T (=C12−preset delay time).

Step 170 finds a time offset α1 associate with the pulse width ΔT12 in the α1 table 80. Step 180 corrects the signal transit time T with the found time offset α1 as follows:

$$T \leftarrow T - \alpha 1.$$

Step 190 finds a time offset β1 associate with the corrected transit time T and the pulse width ΔT12 in the β1 tables 82: i.e., a time offset β1 associate with the pulse width ΔT12 in the β1 table 82-$i$ associated with the corrected transit time T. Step 200 further corrects the signal transit time T with the found time offset β1 as follows:

$$T \leftarrow T - \beta 1.$$

On the other hand, if the measured times do not include T1 and T2 but only include T3 and T4 in step 140, then the control is passed to step 150a. Step 150a finds the pulse width T34 and the middle time C34 between T3 and T4 as follows:

$$\Delta T34 = T4 - T3, \text{ and}$$

$$C34 = (T3 + T4)/2.$$

Step 160a regards the middle time C34 minus the preset delay time as the signal transit time T (=C34−preset delay time).

Step 170a finds a time offset α2 associate with the pulse width ΔT34 in the α2 table 81. Step 180a corrects the signal transit time T with the found time offset α2 as follows:

$$T \leftarrow T - \alpha 2.$$

Step 190a finds a time offset β2 associate with the corrected transit time T and the pulse width ΔT34 in the β2 tables 83: i.e., a time offset β2 associate with the pulse width ΔT34 in the β2 table 83-$i$ associated with the corrected transit time T. Step 200a further corrects the signal transit time T with the found time offset β2 as follows:

$$T \leftarrow T - \beta 2.$$

Thus, an α-error corrected and STC-distortion error corrected signal transit time T is obtained.

Step 210 converts the resultant signal transit time T into the distance D by multiplying the time T by a half of the light velocity. Step 220 makes a test to see if the predetermined scan range has been exhausted. If not, then step advancing the angular position to the next position, the control is returned to step 120.

If the predetermined scan range has been exhausted in step 220, then the control is passed to step 300, where the controller 30 makes a test to see if there is any distance values. If not, then step 330 stores information indicative of the absence of object in the radar scan range and outputs no distance data.

If there are any distance values, then step 310 groups the distance values by the distance. Since the radar apparatus 1 measures the distance for each of a predetermined number of angular positions, there is a possibility of obtaining more than one distances from reflection signals from an identical reflection object. For this reason, distance values that have similar magnitudes and obtained for adjacent angular positions are preferably grouped into a single group. Then, step 320 outputs a distance value for the single group as a distance to an identical object.

According to the invention, a measured signal transit time is collected with a signal intensity-caused error correction value (α), and the corrected signal transit time is further corrected with an STC distortion error correction value associated with the corrected signal transit time and the signal intensity. The distance is calculated from the resultant signal transit time. Therefore, the STC distortion error of the measured distance can be precisely corrected regardless of the intensity of the received reflection signal.

Signal intensity-caused error correcting time offsets α1 and α2 and STC distortion error correcting time offsets β1 and β2 are prepared for higher-intensity and lower-intensity reflection signals so as to use, for higher-intensity reflection signals, a pulse width which is obtained through a higher reference voltage and accordingly is less affected with the measurement error due to various noises.

Since the signal transit time is determined by using a middle time between a pulse width, errors in the detection of the pulse width are arithmetically averaged, which contributes to enhancement of the precision.

In the above-described preferred embodiment, two kinds of signal intensity-caused error correcting time offsets α1 and α2, two kinds of STC distortion error correcting time offsets β1 and β2, and two reference voltages Vr1 and Vr2 are used for higher-intensity and lower-intensity reflection signals. However, one kind of signal intensity-caused error correcting time offsets α, one kind of STC distortion error correcting time offsets β, and one reference voltage may be used regardless of the intensity of the reflection signals. In this case, steps 150a through 200a may be omitted in FIG. 10.

In the above-described embodiment, the signal intensity-caused error correction and the STC distortion error correction are made to the signal transit time. These correction may be made to a distance value calculated from the signal transit time.

The present invention is applicable to distance measuring apparatus for use in motor vehicles, aircrafts, mobile devices, fixed stations for monitoring mobile devices, etc.

Instead of using a laser diode as a transmission signal transmitter, any other suitable radio waves or ultrasonic waves may be used.

Many widely different embodiments of the present invention may be constructed without departing from the scope of the present invention. It should be understood that the present invention is not limited to the specific embodiments described in the specification, except as defined in the appended claims.

What is claimed is:

1. A method of measuring a distance to a reflection object in a radar apparatus which transmits a transmission signal and applies a sensitivity time control (referred to as "STC") process to a reflection signal from said reflection object to yield an STC-processed reflection signal, the method comprising the steps of:

obtaining a quantity corresponding to said distance from a transmission time of said transmission signal and a detection time of said STC-processed reflection signal; and correcting said quantity considering an error which is caused by an STC distortion and depends on an intensity of said STC-processed reflection signal.

2. A method as defined claim 1, wherein said step of correcting said quantity comprises:

correcting said quantity by using a first correction value associated with said intensity of said STC-processed reflection signal to provide a corrected quantity; and correcting said corrected quantity by using a second correction value associated with said corrected quantity and said intensity of said STC-processed reflection signal to correct said error regardless of said intensity of said STC-processed reflection signal.

3. An apparatus for measuring a distance to a reflection object, the apparatus includes;

means for transmitting a transmission signal;

means for applying a sensitivity time control process to a received signal from said reflection object to provide an STC-processed signal;

means for obtaining a quantity corresponding to said distance from a transmission time of said transmission signal and a detection time of said STC-processed signal; and means for correcting said quantity considering an error which is caused by an STC distortion and depends on an intensity of said STC-processed reflection signal.

4. An apparatus as defined claim 3, wherein said means for correcting said quantity comprises:

means for correcting said quantity by using a first correction value associated with said intensity of said STC-processed reflection signal to provide a corrected quantity; and means for correcting said corrected quantity by using a second correction value associated with said corrected quantity and said intensity of said STC-processed reflection signal to correct said error regardless of said intensity of said STC-processed reflection signal.

5. An apparatus as defined in claim 4, further including means for detecting a pulse width of said STC-processed signal through a comparison with a reference voltage, wherein said means for correcting said quantity and means for correcting said corrected quantity use said pulse width detected by said pulse width detecting means as said intensity of said STC-processed signal.

6. An apparatus as defined in claim 5, wherein said means for detecting a pulse width of said STC-processed signal comprises:

means for detecting a wider pulse width of said STC-processed signal by using a lower reference voltage, wherein the apparatus further includes:

means for detecting a narrower pulse width of said STC-processed signal by using a higher reference voltage higher than said lower reference voltage, wherein said means for correcting said quantity comprises:

means, in the event said narrower pulse width is obtained in addition to said wider pulse width, for correcting said quantity by using a first-class first correction value associated with said narrower pulse width to provide said corrected quantity; and means, in the event only said wider pulse width is obtained, for correcting said quantity by using a second-class first correction value associated with said wider pulse width to provide said corrected quantity, and wherein said means for correcting said corrected quantity comprises:

means, in the event said narrower pulse width is obtained in addition to said wider pulse width, for correcting said corrected quantity by using a first-class second correction value associated with said corrected quantity and said narrower pulse width of said STC-processed signal; and means, in the event only said wider pulse width is obtained, for correcting said corrected quantity by using a second-class second correction value associated with said corrected quantity and said wider pulse width of said STC-processed signal.

7. An apparatus as defined in claim 5, wherein said means for obtaining a quantity corresponding to said distance includes:

means for calculating a middle time of said pulse width of said STC-processed signal as said detection time of said STC-processed signal.

8. An apparatus as defined in claim 5, wherein said means for detecting a pulse width of said STC-processed signal includes:

means for providing a signal the level of which is kept at a certain level during a period when a level of said STC-processed signal is higher than said reference voltage; and means for measuring said period.

* * * * *